United States Patent
Anand et al.

(10) Patent No.: US 10,153,002 B2
(45) Date of Patent: Dec. 11, 2018

(54) SELECTION OF AN AUDIO STREAM OF A VIDEO FOR ENHANCEMENT USING IMAGES OF THE VIDEO

(71) Applicant: Intel Corporation, Santa Clara, CA (US)

(72) Inventors: Jerome L. Anand, Bangalore (IN); Kumaran Sethuraman, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/099,845

(22) Filed: Apr. 15, 2016

(65) Prior Publication Data

US 2017/0301371 A1    Oct. 19, 2017

(51) Int. Cl.
| | | |
|---|---|---|
| G11B 27/00 | (2006.01) | |
| H04N 5/95 | (2006.01) | |
| G11B 27/034 | (2006.01) | |
| G11B 27/10 | (2006.01) | |
| G11B 27/34 | (2006.01) | |
| G11B 27/28 | (2006.01) | |
| H04N 9/80 | (2006.01) | |
| H04N 5/765 | (2006.01) | |

(52) U.S. Cl.
CPC .......... *G11B 27/034* (2013.01); *G11B 27/002* (2013.01); *G11B 27/105* (2013.01); *G11B 27/28* (2013.01); *G11B 27/34* (2013.01)

(58) Field of Classification Search
CPC . G11B 27/00; H04N 5/93; H04N 9/80; H04N 5/765
USPC ................ 386/285, 278, 280, 239, 248, 200
See application file for complete search history.

(56) References Cited

U.S. PATENT DOCUMENTS

| | | | | |
|---|---|---|---|---|
| 7,379,962 | B1 * | 5/2008 | Matsuoka | ............... H04M 3/56 709/203 |
| 7,664,246 | B2 * | 2/2010 | Krantz | ................. H04M 3/569 348/14.09 |
| 2004/0205477 | A1 | 10/2004 | Lin | |
| 2004/0213093 | A1 * | 10/2004 | Seo | ...................... G11B 27/034 369/30.04 |
| 2011/0087662 | A1 * | 4/2011 | Darby, Jr. | ............. G06Q 10/06 707/736 |
| 2015/0117649 | A1 | 4/2015 | Nesta et al. | |
| 2015/0264529 | A1 * | 9/2015 | Cho | ................... H04M 1/7253 455/456.6 |

(Continued)

FOREIGN PATENT DOCUMENTS

CN    104378635    2/2015

OTHER PUBLICATIONS

PCT International Search Report and Written Opinion of the International Searching Authority for International Application No. PCT/US2017/017028, dated May 24, 2017, 9 pages.

*Primary Examiner* — Daquan Zhao
(74) *Attorney, Agent, or Firm* — Womble Bond Dickinson (US) LLP

(57) ABSTRACT

An audio stream of a video is selected for enhancement using image of the video. In one example, audio streams in the video are identified and segregated. Points of interest and their locations are identified in the image of the video. The position of each audio stream is plotted to a location of a point of interest. A selection of a point of interest from the sequence of images is received. A plotted audio stream is selected based on the corresponding point of interest and the selected audio stream is enhanced.

20 Claims, 6 Drawing Sheets

(56) References Cited

U.S. PATENT DOCUMENTS

2015/0302863 A1 10/2015 Dacosta
2016/0086368 A1* 3/2016 Laaksonen .............. G06T 13/80
　　　　　　　　　　　　　　　　345/473

* cited by examiner

SELECTION OF AN AUDIO STREAM OF A VIDEO FOR ENHANCEMENT USING IMAGES OF THE VIDEO

FIELD

The present description relates to video presentation and editing and, in particular, to selecting and modifying an audio stream in a video based on images in the video.

BACKGROUND

With the proliferation of portable, lightweight, video cameras, more videos are being captured in casual settings and without sophisticated recording equipment. For planned events and high value video, microphones are placed near people and things in order to capture the sounds that are most important for each portion of the video. The resulting video is synchronized with audio tracks for each microphone that can be independently amplified and mixed for each frame of the video. When careful microphone placement is not possible, for example at sporting events, directional microphones are used to capture sound primarily from particular locations on the playing field or in the stands. A directional microphone is able to amplify sound coming from a particular direction over other sounds and ambient noise.

Some video cameras, tablets, and smartphones are equipped with multiple microphones in the housing of the device. The microphones are spaced apart, for example, each at a different corner of the device, so that beam forming techniques can be used to isolate sounds from particular directions. These multiple microphone systems are normally used to isolate a speaker's voice over the ambient noise. To capture a more remote speaker using beam forming requires that the user identify that speaker while the video recording is being made.

Another common video camera location is in a conference or meeting room. When there are multiple speakers in different locations in a conference room, some systems will provide microphones around a table so that there is a microphone near each speaker. In other systems, there are directional microphones at a central location or even a single microphone at that single location. A remote participant in the conference at another location is, in some cases, able to choose a particular microphone and have that microphone amplified. In other systems, the user is able to select a particular direction and a central microphone or microphone array can use beam-forming, tagging, or some other approach to focus on a specific speaker and enhance the voice of that speaker for the remote participant.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

As described herein, a direction from which an audio source was received is determined in a recorded video. The selected content is then filtered and enhanced to zoom in on the desired audio. This may be done as the video is being viewed. The selection may also be saved for a type of video post-processing. The approach described herein is a type of static audio zooming. It splits the desired audio signal out from a group of signals in pre-recorded video content. The audio is then enhanced to produce a zooming effect for the end user. This may be done using an indicated point of interest from the user.

Figure 1:
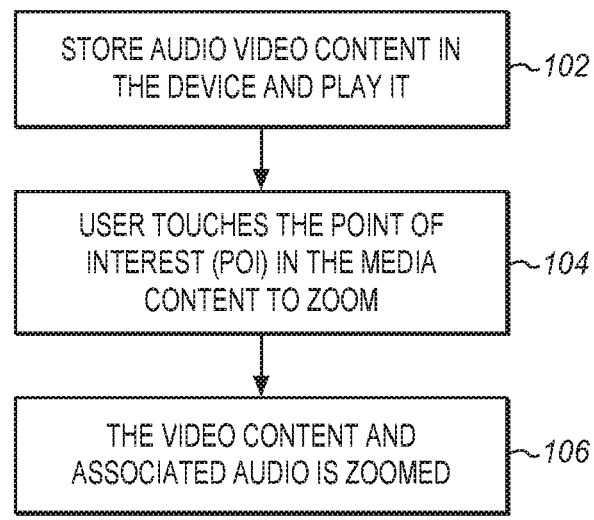
FIG. 1 is a process flow diagram of an audio zooming user experience according to an embodiment.

FIG. 1 is a process flow diagram of an example user experience. This process is presented from the perspective of the end user or device operator. At 102 a video, which here is used to refer to a sequence of image frames with associated and synchronized audio, is played on a device. The video may be retrieved from local or remote storage. The video may have been captured with the same device or with another device and then transferred to the local or remote storage.

At 104 the user touches a point of interest (POI) in the media content to zoom in on the audio from that POI. The POI may correspond to a particular person or group of people or it may correspond to any other object that produces sound. The user is watching the video on a display and has a selection device, such as a touch screen overlay, a pointing device, or a gesture control camera system. The user indicates a particular area of the display to identify the POI. The user may touch or click on the center of the POI or the user may indicate an area of the display corresponding to an area of the video. This would allow the user to indicate a size range or the boundaries of an area of interest.

At 106, the audio is zoomed for the POI. In other words, the audio emanating from the POI in the video is enhanced. This may include amplifying the selected audio over audio from other areas. The selected audio may also be filtered or processed in some other way to bring it out over the surrounding aural environment. The video content may also be zoomed or magnified over video from other areas, depending on the particular implementation. Any of a variety of image processing techniques may be used to zoom the images in the video. The present description is directed to zooming the audio portion of the video.

By separating audio sources by image region or image points of interest, the user can zoom in on a particular part of an image of the video scene. This provides an enhanced experience during the playback of pre-recorded video on a tablet, smart phone or other user terminal. The user may want to listen to the audio from a particular group of people or the content from some other particular audio source. The techniques described herein allow digital signal processing to be used so that the user may select a particular speaker or audio source and enhance that source. This may be done without prior knowledge of the microphone placement and without prior tagging of the different audio sources When a video has already been recorded and is then later being displayed to the user, standard beam-forming and tagging techniques cannot be used. As described below, the phase of the signal may be used together with other correlation techniques to achieve a result similar to beam-forming and tagging. While the approaches described herein are particularly useful for offline processes, e.g. playback of pre-recorded video, they may also be applied to live video-conference and other types of interactive live video.

Figure 2:
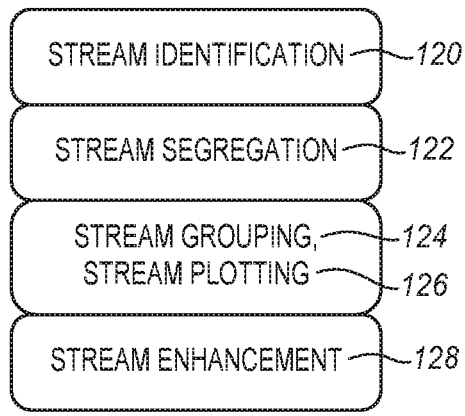
FIG. 2 is an overview process flow diagram of providing audio zooming in a device according to an embodiment.

FIG. 2 provides an overview of a process flow for zooming in on a particular part of the audio. The process flow of FIG. 2 is a process inside a device that allows the device to provide the user experience of FIG. 1, but is not directly visible to a user. The process flow is a sequence of different processes that are performed in sequence. The first process at 120 is stream identification. This process may be described as identifying the number of valid audio streams in the entire audio content of the video or a portion of the video, such as a scene.

This is followed by stream segregation at 122. Each of the identified audio streams is segregated to permit independent analysis and processing. This is then followed by stream grouping 124. Each of the individual audio streams is grouped according to a general location of the source of the respective audio stream in the image sequence of the video. The general locations are referred to herein as regions. As an example, an image may be divided into four regions or quadrants and each image may be assigned to a particular one of the four quadrants of the images. In other examples, different number of regions may be used. The regions may also be unequally distributed. As an example, if the images feature an area of sky above a scene, the entire sky may be identified as one region and then the area below the sky may be divided into three or more regions, such as left, center, and right. The quadrant technique is provided as an example. Other techniques may be used alternatively or in addition to isolate an audio source. More sophisticated video processing, including zooming, selecting, and isolating may be used to select a particular audio source.

The grouped streams are then processed by stream plotting 126. This may be described as associating the streams with different positions or with different areas, such as different quadrants, in the images in the video. The audio streams may be split and tagged for their relationship to the video images. This may be referred to as an image-audio relationship.

After the plotting, when a user selects a particular POI, then the system can identify the valid streams in the vicinity of the point of interest (POI) in a corresponding image of the video. The image at the POI is associated with the respective audio stream. In other words, the audio stream is associated with the selected part of the image corresponding to the POI. In some embodiments the plotting connects one or more of the audio streams to a particular POI. With POI tracking, the audio stream continues to be connected to the POI even as the POI moves across the frames of the video. When a user selects a particular POI, the POI is plotted directly to an audio stream and that audio stream is selected in response to the POI selection.

After a particular one or more of the streams is selected, those selected streams are processed by stream enhancement 128. Any of a variety of different post processing techniques may be used to bring the individual stream or group of streams out from the other audio of the video sequence and produce an audio zoom effect. The audio enhancements may include amplifying, filtering, or processing in some other way to enhance the stream or streams so that they are more audible than before the enhancement.

For the techniques described herein, the original media content being displayed and then processed has been recorded using a stereo microphone or a microphone array with two or more microphones. While a stereo microphone array, that is an array of two spatially separated microphones, is able to differentiate audio at different locations from left to right. Such an array is not able to distinguish audio at different heights. In some cases, one or more vertically separated microphones may be used of or in addition to the stereo microphones. In the examples herein, the stereo microphone, two microphones side-by-side aimed in different directions, is placed at the center of the recording environment. In addition, the audio content is assumed to have not already been post-processed. For audio that has already been processed, additional operations may be required to compensate for the processing. These additional compensating operations are not described herein.

Figure 3:
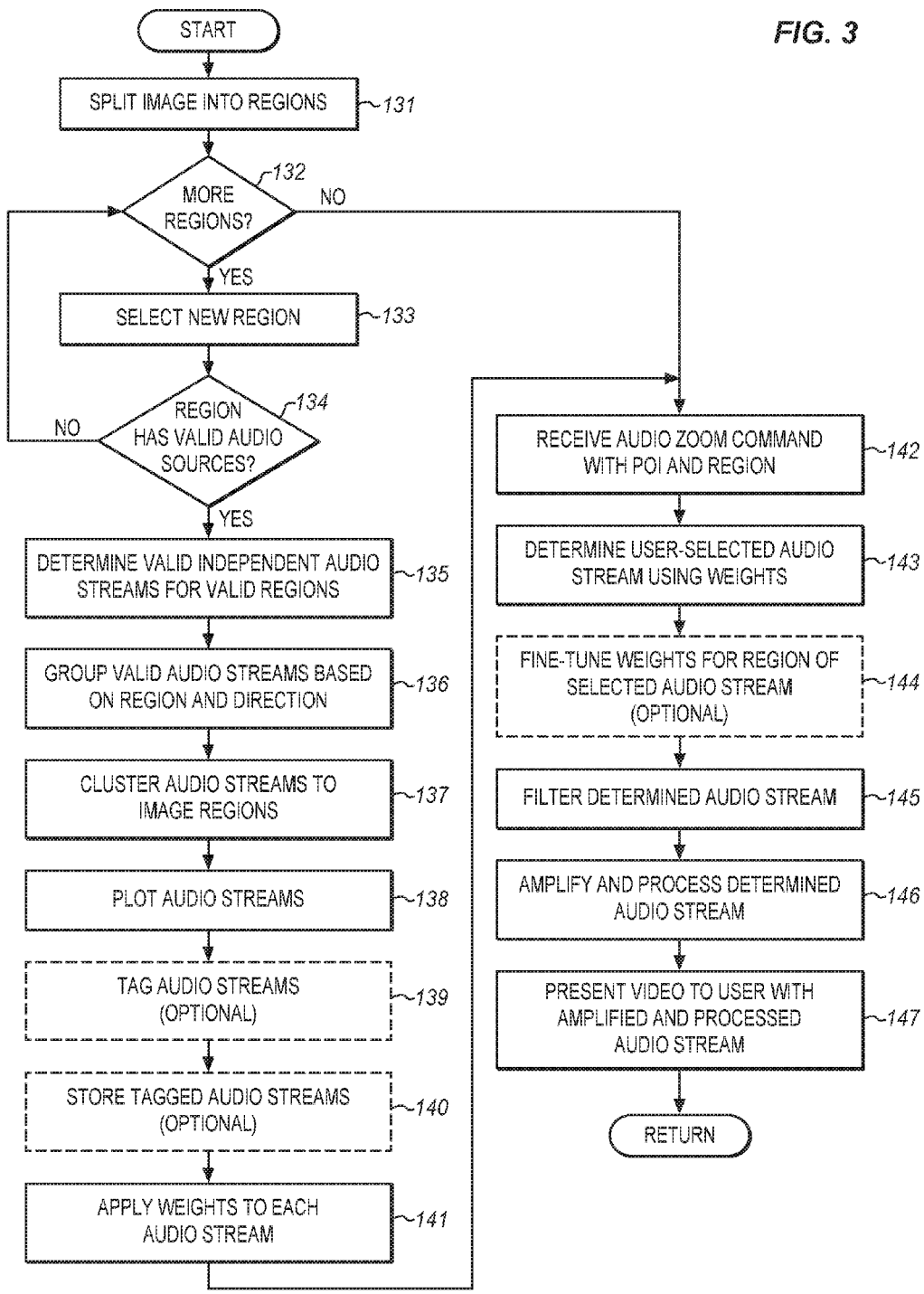
FIG. 3 is a process flow diagram of audio zooming in a device according to an embodiment.

FIG. 3 is a process flow diagram to present operations for FIGS. 1 and 2 in more detail. As the video is played back from storage or live from a remote teleconferencing node it will be presented on the device. At 131 the image is first split into regions. This may be done at the playback device or at some other device in the path to the playback device. In some embodiments, the image is split into four equal quadrants. These quadrants may be seen as being in different locations on an X and a Y axis. While four regions are used, there may be more or fewer regions, depending on the implementation. In addition, as mentioned above, the regions may have differing proportions of the total area of an image. The regions may be smaller for parts of the image that have many features and larger for parts of the image that have fewer features.

At 132, the different images and the four quadrants or regions are selected for validation. At 132 if there are regions to evaluate, then at 133, a region is selected. When there are no more regions to evaluate then the process goes to 142 to receive an audio zoom command from the user interface of the device. At 134 each region of each image in the video stream is analyzed to determine if there are valid audio sources in that region. Face detection, object detection and similar techniques may be applied to each quadrant to determine whether there is a valid audio source. In some cases, audio may be from a source that is not visible in the images. The audio may be an off-screen narrator, a background noise, or simply a speaker or other object that is outside of the view of the camera.

At 134 for each region that does not have a valid audio source, the operations below are not performed and the process goes to 142. This reduces the computational load. Any audio that would seem to come from a region without valid audio sources may be ignored. For regions that do have valid audio sources, the corresponding audio streams are isolated and localized.

At 135, the number of valid independent audio streams is determined. The number of valid sources at 134 might not equate to the number of independent audio streams. Some of the objects may not be producing audio and some of the audio may be produced by off-screen objects.

Figure 4:
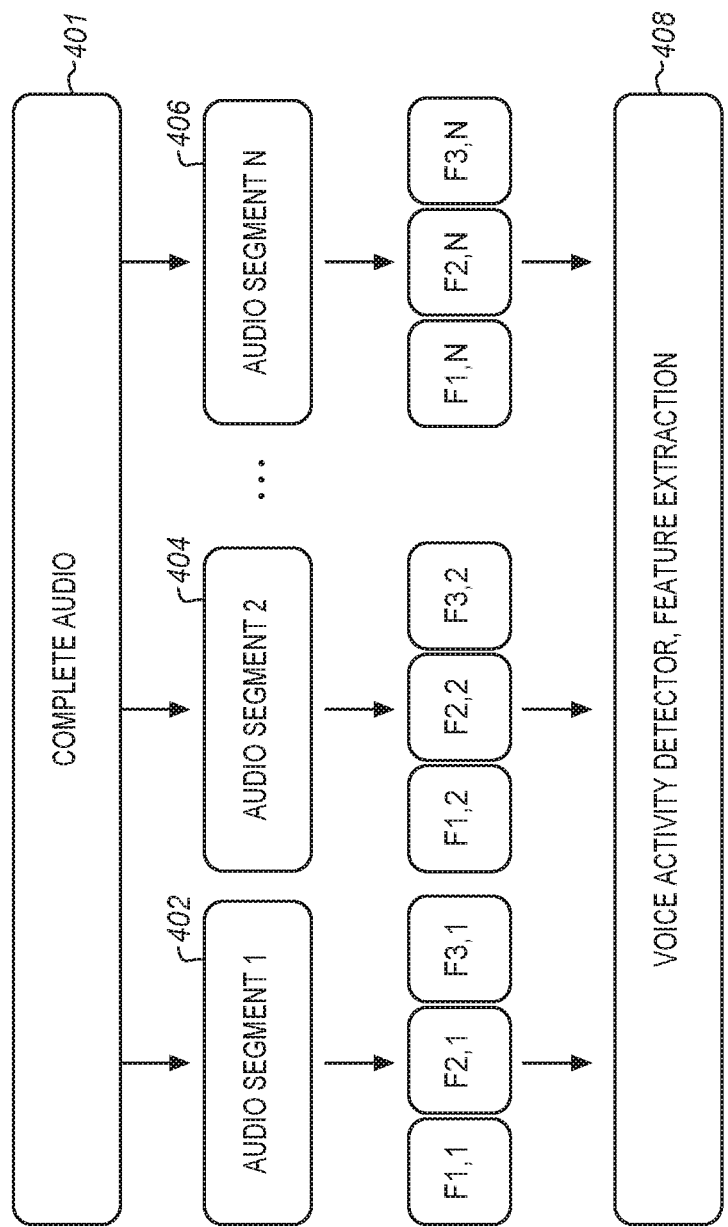
FIG. 4 is a diagram of sorting and classifying audio streams by frame according to an embodiment.

The process of determining valid audio sources in the images of the video sequence may be understood by reference to FIG. 4. First the complete audio content 401 as shown in FIG. 4 is classified. In other words, it is divided into broad categories 402, 404, 406 such as speech, non-speech, noise, and any other additional categories. The different segments may be selected based on the nature of the device or the particular operating environment. For a conference room device, most of the sources may be speech, but there may also be music, product sounds, or other sounds that are presented during the conference. FIG. 4 is a diagram of audio segment processing according to an embodiment.

The segmented audio blocks are further sub divided into audio frames, labeled as F1.1, F2.1, F3.1 etc. for audio segment 1 402, as F1.2, F2.2, F3.2 for audio segment 2, etc. There may be more or fewer than three audio frames for each audio segment. As an example, consider that there is an audio speech signal in an audio content of a 1 second window. The audio frames may be processed using, for example, a 50% overlap method. The resulting speech signals are then processed at 408 in FIG. 4 for voice activity, feature extraction and other features of the respective audio frame. The signals may, for example, be passed through a voice activity detector (VAD) that returns a VAD decision for each frame. Using the results from the VAD any speech signal in any 1 second window may be identified.

The information in the image portion of the video content for the same 1 second window may also be used to increase the accuracy of the speech decision results. A variety of different image processing techniques may be used to analyze the images within the window.

The different frequencies or features in each time window may be extracted using any of a variety of feature extraction techniques such as FFT (Fast Fourier Transform), MFCC (Mel-frequency cepstral coefficient), or others. As a result, the number of valid audio streams in each time window is identified.

Returning to the process flow of FIG. 3, after the audio streams are determined, then at 136, the audio streams are grouped based on the region, e.g. quadrants and the direction. The individual audio streams have already been identified above. The phase may be determined in different ways. The phase may be used to determine direction. For purposes of the present embodiment two microphones or a stereo microphone is used.

Figure 5:
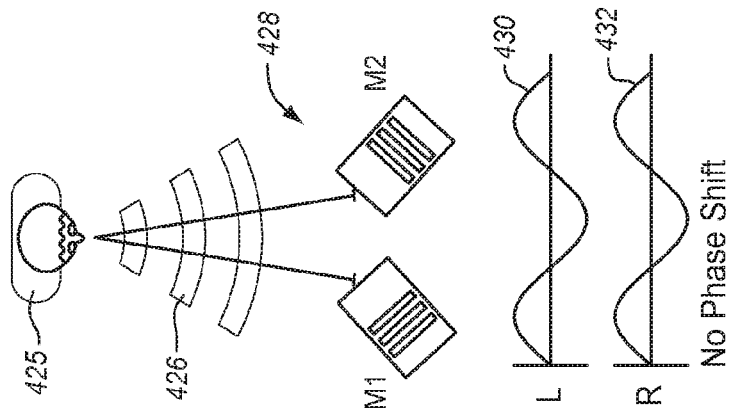
FIG. 5 is a diagram of a recording scene in which a speaker is centered between two microphones according to an embodiment.

The determination of audio location is described with reference to the diagrams of FIGS. 5, 6, and 7. FIG. 5 is a diagram of a recording device in an audio environment. It shows a simple recording scenario in which two microphones M1, M2 or a stereo microphone 425 are used. The microphones are separated by a fixed distance. In some embodiments the microphones are mounted at different locations on a portable tablet, smart phone, or camera that is recording the video. In other embodiments external microphones are used. A stereo microphone has two microphones oriented in different directions but mounted to the same housing so that the two microphones may be handled as if they are a single external microphone. A speaker 425, such as a person participating in a video conference, or any other audio source, is positioned in front of the microphones and generates audio waves that impinge upon the microphones.

In FIG. 5, the speaker is equidistant from the microphones. The sound from the speaker arrives at both microphones at the same time so there is no phase difference. The left microphone generates an L electrical signal 430 in response to the audio wave. The right microphone generates an R electrical signal 432 in response to the audio wave. These two signals are identical and in phase because the speaker is the same distance from each microphone. By comparing the L and R phase, the system can determine that the audio source is directly in front of the microphone. If the microphone is in the center of the image, that is if the camera and microphones are aligned to a common central reference point, then this audio source will be in the center of the image as determined from left and right.

While the two microphones are only able to resolve horizontal position, a third vertically displaced microphone may be added to the microphone array. By comparing the phase of the audio received at the vertically displaced microphone with the phase received at one of the other two microphones, the vertical displacement of the audio source may also be determined. Accordingly, using three microphones, an audio source may be determined in two dimensions.

Figure 7:
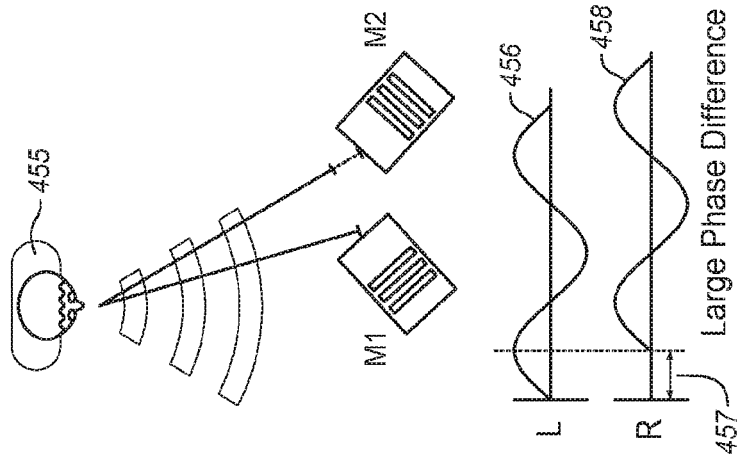
FIG. 7 is a diagram of the recording scene of FIG. 6 in which the speaker has moved further to the left according to an embodiment.
Figure 6:
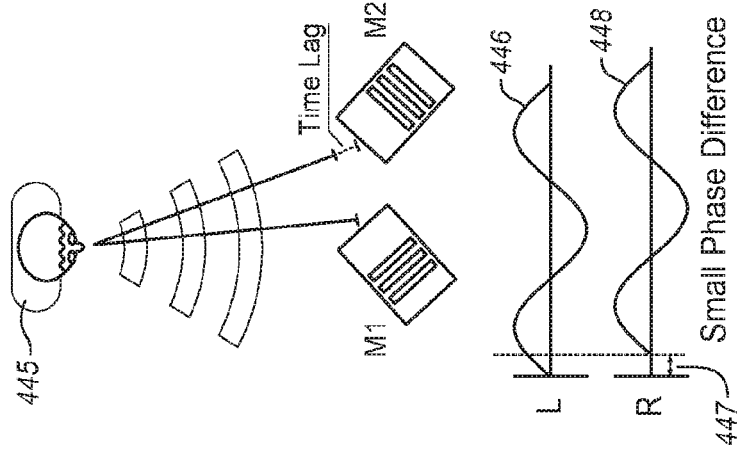
FIG. 6 is a diagram of the recording scene of FIG. 5 in which the speaker has moved to the left according to an embodiment.

If the speaker is in a different position as shown in FIGS. 6 and 7, then the electrical signals from the microphones will be out of phase. The phase difference depends on the difference in distance from the speaker to each microphone. The sound from the speaker will take more time to travel to the microphone that is farther away. This time delay to reach the more distant microphone may be used to determine the relative distance of the speaker from the two microphones. The microphone placement in the recording device also affects the direction from which the audio is recorded. When either the microphone or the speaker moves, the position of the audio source will be different with respect to each microphone. Thus, the speech signals will have different times of arrival at each microphone.

FIG. 6 is a diagram of the recording scenario of FIG. 5 in which a speaker 445 has moved to the left, as shown in the drawing, relative to the microphones M1 M2. The speaker is now closer to M1 than to M2. Accordingly, the audio arrives at M2 after it arrives at M1. This is indicated as a time delay 447 in the audio wave. There is a corresponding time delay in the R curve 448 of the electrical signal relative to the L curve 446.

FIG. 7 is a diagram of the recording scenario of FIG. 5 in which a speaker 455 has moved even further to the left. The time delay 457 is even greater for the R curve 458 relative to the L curve 456. If the speaker instead had moved to the right, then there would be a time delay for the L curve instead of for the R curve. As seen by comparing the R curves of FIGS. 5, 6, and 7, the relative distance of the speaker from the center between the two microphones are related to the amount of time delay between the two microphone outputs. If the image camera is between the two microphones, then an audio source with no delay is in the center of the image. An audio source with a delay in the right microphone is on the left side of the image and an audio source with a delay in the left microphone is on the right side of the image. The greater the phase delay between the two curves, the farther the speaker is to the left or right of the center.

If the camera is not centered between the two microphones then the position of the audio source in the image may be adjusted to compensate for the position of the camera relative to the microphones.

This difference in the time of arrival of the audio signal at the two microphones can be estimated using correlation techniques. Using the time difference, the position of the audio source relative to one microphone can be identified. The results can be affected by any noise that is also in the signal. The noise can be addressed and compensated for using estimators that are configured to deal with such noise such as GCC PHAT (Generalized Cross Correlation-Phase Transform) to sharpen the correlation peaks and precisely estimate the exact time delay or TDOA (Time Difference of Arrival) of the signal at the two microphones.

Generalized cross-correlation can be computed in both the time domain and the frequency domain. Pre-filtered signals can be used in sharpening the peak in the cross-correlation function. The particular cross-correlation technique may be adapted to suit the particular hardware. Generalized cross-correlation in the time domain is computationally complex but does not require an FFT or inverse FFT. Generalized cross-correlation in frequency domain is simpler at least if there are other processes that generate and use the FFT.

In some embodiments, the direction of arrival (DOA) for each audio stream is determined using a DFT (Discrete Fourier Transform) and narrowband estimation. This is then correlated to a horizontal direction in the corresponding image of the video. The spectrogram of a typical speech signal has significant power over a wide range of frequencies together with particular formant frequencies. Some frequencies have significantly higher power within the range than other surrounding frequencies.

To estimate the DOA, a DFT may be applied to the speech frame to get the frequency domain coefficients. Such a DFT is available as a standard tool in many digital signal processors. A threshold power level is selected and then the frequency coefficients are thresholded. Only frequencies with power above the threshold are used. This may be done using a peak-picking algorithm applied on these coefficients to pick up the dominant frequencies. A frequency domain narrowband DOA estimation may then be performed at each of these selected high power frequencies. The mean of the DOA estimates may be used to find a good approximation to the actual DOA.

The DOA may then be used to determine horizontal position. The magnitude of each audio stream signal may be used as an aid to identify which signal is nearer to the microphone and which signal is farther. If the signals are speakers at a meeting conference, people in a room tend to match each other's speaking volume. This makes the magnitude or loudness a useful estimate. If the audio sources are not all people, then the classification of the audio streams at 135 may be used to adjust for the anticipated volume differences. Some audio sources may be assumed to be louder or quieter. In some cases only similar audio sources are compared to each other to estimate relative distances.

Returning to the process flow of FIG. 3, at 137, the audio streams are clustered into their respective regions. This first clustering is a coarse or general clustering. For an image divided into quadrants, the audio is assigned to either the left half of the image or the right half of the image. For this clustering, a variety of different tools may be used such as the relative times of arrival, the relative phase of the right and left microphone signal, and image processing techniques, such as face detection.

For object detection, if there is only one face or if all of the faces are on one side of the image, then any voice audio stream may be assigned to the side of the image that has the faces. A similar approach may be used to assign other types of audio streams to the respective image locations of other types of objects.

In many instances the exact locations for each audio stream in a video cannot be plotted just with the above three parameters. More accuracy may be applied to provide a satisfactory user experience.

At 138, the individual audio streams are plotted. In one example, one of the audio streams in one of the clusters is selected to be a reference signal for all of the other streams in the same cluster. A cross correlation is then performed with each audio stream against the reference signal. The results of the cross-correlation may then be used to find the elevation angle of each of the streams within the cluster. This may then be repeated for each of the clusters in an image.

At 139, each individual stream is optionally tagged for speaker movement and for future reference in the stored video. The tag may be in the form of metadata or in any other form and may include any suitable information such as audio type, corresponding frame numbers, image region or quadrant, and other information developed during the operations described above.

At 140, each audio stream is optionally stored with its respective tag in a temporary folder. At the end of the process of playing or editing the video, the streams may all be deleted. This allows for the streams to be modified and compared without affecting the original content in the video.

At 141, weights are determined for each individual stream in each of the quadrants. The weights are a score of a valid audio stream. It is derived based on the location parameters mentioned above, such as time of arrival, direction (phase) and magnitude of the signal. Weights may be calculated in any of a variety of different ways. In one example, the weights are determined by taking one audio stream as a reference and then comparing the other audio streams to the reference. This allows undesired audio, such as background noise to be weighted as less important, reducing the chances that it will be enhanced by mistake. In this way the weights may be used to reduce errors and yet also keep the desired data intact for further processing.

At 142 with the audio streams prepared, the user interface audio zooming is provided. This starts with receiving an indication of a POI or simply a region from a user. The POI is then localized to a region of the image, such as a quadrant.

At 143 the stream corresponding to the user-selected POI is determined. This stream will be within the selected quadrant. The quadrants are used to simplify the search for an appropriate stream.

At 144 the weights for the selected quadrant are optionally recalculated. Having determined the area of the image that interests the user, it may provide better results, if the weights and other parameters are fine-tuned to emphasize the area of interest. The fine-tuned weights may be applied to only the region that includes the POI or to the entire image to refine the determined parameters for the image.

At 145, filters are applied to the determined stream, i.e. the audio stream selected by the user. These filters may be to enhance clarity, remove noise or to achieve any of a variety of other functions to improve the selected audio stream or to make it stand out from the others.

At 146, amplification and audio processing systems may be applied to the selected audio stream. Other streams localized as near the selected stream may also be amplified or processed to de-emphasize these streams or to give a real time experience.

At 147, the video presentation is modified by presenting the images with modified audio. The modified audio uses the amplified and processed version of the user-selected audio stream.

The process then returns to the beginning. The audio stream identification and localization operations above may be performed continuously during the play of a video. For some videos with multiple audio streams, the position of the streams will move and some streams will stop while new ones are introduced. With the streams already identified and localized for the current video frame, the system is then ready to amplify and process any one particular stream or a group of streams when the user selects that stream.

Figure 8:
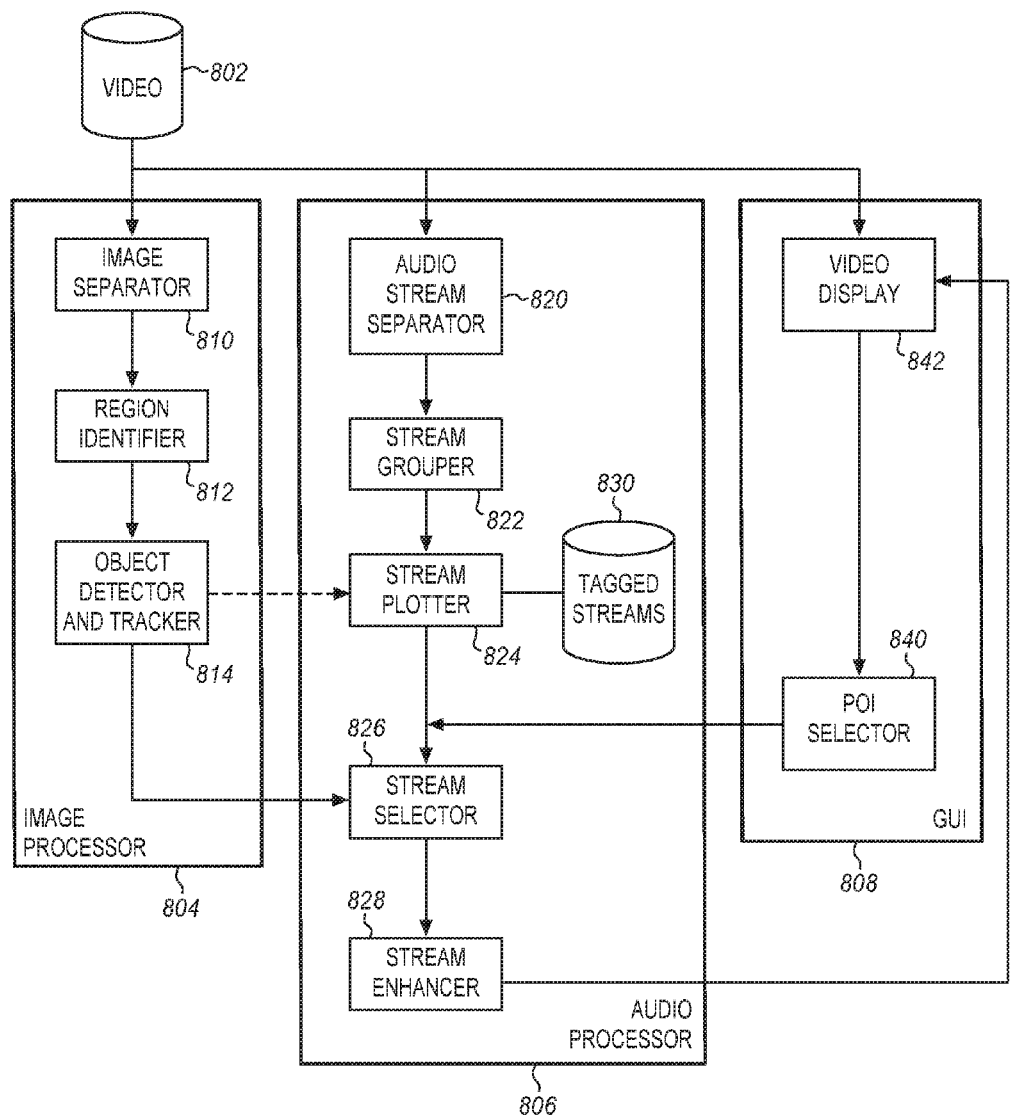
FIG. 8 is a block diagram of a video processing system according to an embodiment.

FIG. 8 is a diagram of a video processing pipeline to implement the process of FIG. 3 as described above. The video processing pipeline includes an image processor 804, an audio processor 806, and a graphical user interface (GUI) 808. A video source 802 is supplied to each of the sections 804, 806, 808. The video source may be a storage device, such as a mass storage or external storage as shown, or the video may be received from a remote camera system or video conference node.

The image process first divides the video into frames or images in an image analyzer 810. The frames are then evaluated to determine regions 812, such as quadrants or any other suitable region. The regions are then applied to an object detector 814. This detector analyzes each region to determine whether there are object of interest within each frame. The object of interest is an object that is likely to produce audio, such as a person, an animal, or a machine. The objects may first be identified and then classified using any of a variety of different classification systems. In some embodiments, such as for a video conference node, only faces are identified and other possible source of sound are ignored. The object detection may also track objects from frame to frame so that an audio stream from a person that is moving across the video field of view may continue to be linked to the same person.

The audio processor 806 has an audio stream identifier 820. The results are sent as different streams to a stream grouper 822. This module groups the streams by region. The grouped streams are sent to a stream plotter. The stream plotter optionally receives objects of interest from the image processor. This allows the locations plotted to the audio streams to be linked to objects of interest near those locations. The plotted streams may then be stored in s local memory device 830 and also sent to a stream selector 826.

The user interface 808 may take a variety of different forms. For ease of use, the video is presented on a display 842. The user may then select a particular point anywhere in the video using a touchscreen, a pointing device, or any of a variety of other devices. The user identifies a location in the video on the display and this information is converted to a POI in a POI selector 840. The POI selector may receive a set of possible objects from the object of interest detector and select and object of interest closest to the user selection. In one example, the selected object of interest is noted to the user, such as by highlighting or naming the object on the screen. The selected point or object is then provided to the stream selector 826 of the audio processor 806.

The stream selector may also receive the object detection and tracking 814 from the image processor. Using this information, the stream selector selects a stream as the one corresponding to the audio source indicated by the user. The selection of the stream is then provided to an audio enhancer 828. The enhancer operates on the audio stream and optionally also on the other streams and audio of the video to enhance the selected stream. As mentioned above, this may be done by increasing the volume of the selected stream relative to the other streams and also be filtering, or processing the audio streams in other ways. The enhanced audio is then fed to the video display to be presented to the user combined with or substituted for the original audio from the video 802.

The described system connects audio to images within a video stream. This allows a user to have a natural and intuitive interface to modify the audio as the video is presented. The user simply selects an object or area of a screen while watching a video and the audio for that object or area is enhanced. It is as if the user points to a speaker and then that speaker is amplified or is easier to hear. This is a much more intuitive interface than if the user were interacting with a display of the audio. The image of the video provides a more natural view from which to select an object of interest.

Figure 9:
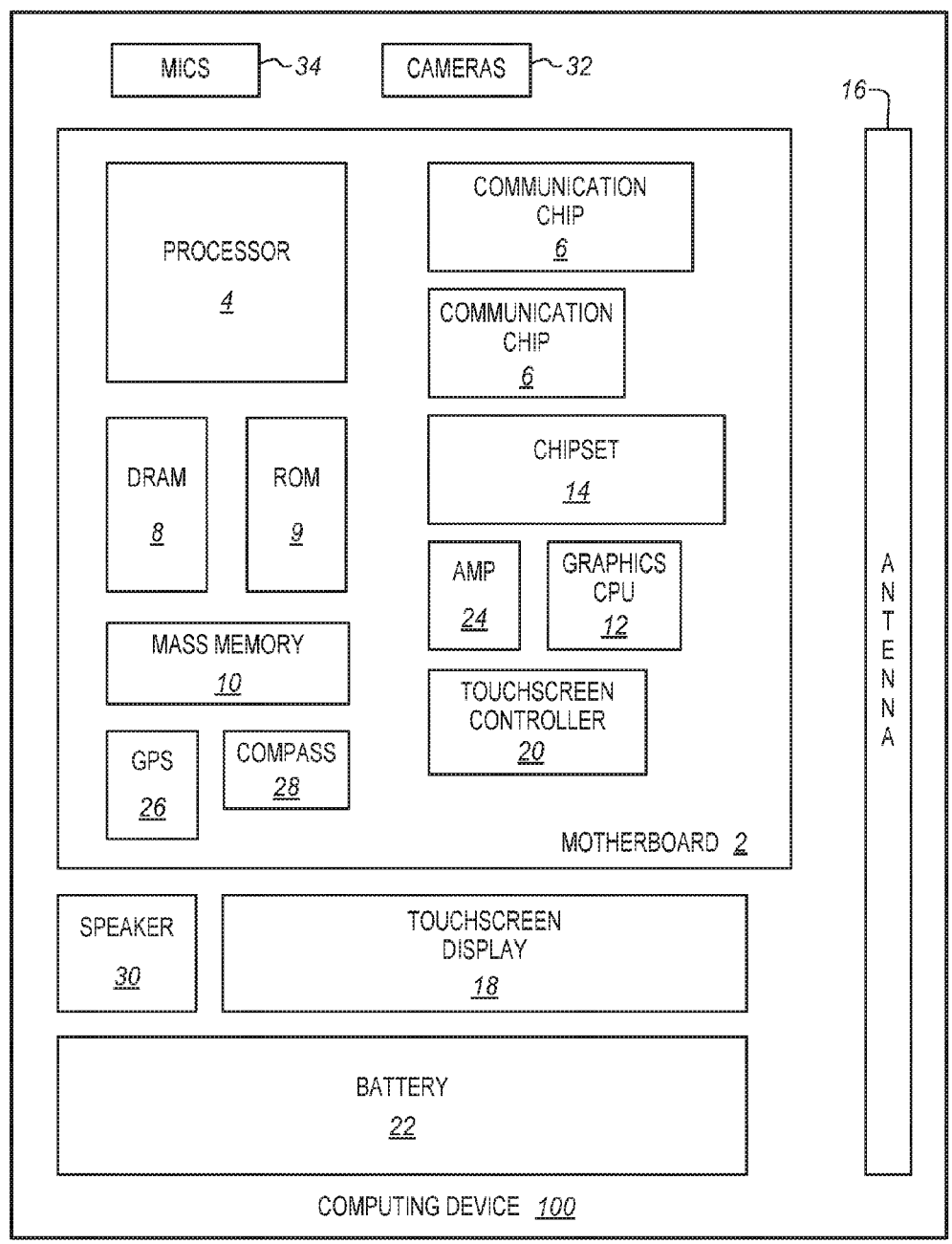
FIG. 9 is a block diagram of a computing device incorporating audio stream enhancement according to an embodiment.

FIG. 9 is a block diagram of a computing device 100 in accordance with one implementation. The computing device may have a form factor similar to that of FIG. 2, or it may be in the form of a different wearable or portable device. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components. The mass memory 10 may be a single hard disk or solid state drive, including flash, phase change, spin transfer torque or any other memory type, or may be provided as several hardware components of the same or of different types. The memory may be internal and external. The types may include USB flash drives, memory cards such as SD (Secure Digital) cards, CF (Compact Flash) cards, as well as internal solid state, spinning disk and hybrid drives.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The microphones 34 and the speaker 30 are coupled to an audio front end 36 to perform digital conversion, coding and decoding, and audio stream selection and enhancement as described herein. The processor 4 is coupled to the audio front end to drive the process with interrupts, set parameters, and control operations of the audio front end. Frame-based audio processing may be performed in the audio front end or in the communication package 6.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes identifying audio streams in audio of a video, the video having a sequence of images and associated audio, segregating the identified audio streams, identifying points of interest in each image, determining locations of the identified points of interest, plotting a position of each audio stream to a location of a point of interest in the sequence of images, receiving a selection of a point of interest in the sequence of images, selecting a plotted audio stream based on the corresponding point of interest, and enhancing the selected audio stream.

In further embodiments plotting a position comprises comparing phase of an audio stream at two different microphones to determine a direction of the audio stream and plotting the position using the determined direction.

In further embodiments plotting comprises cross-correlating audio streams in the frequency domain.

In further embodiments plotting comprises determining a direction of arrival for each audio stream using a discrete Fourier transform and narrowband estimation.

Further embodiments include thresholding frequency coefficients of the discrete Fourier transform to select only frequencies with power above the threshold for use in determining the direction of arrival.

In further embodiments plotting further comprises plotting distance based on the volume of the respective audio stream.

Further embodiments include analyzing the images of the video to divide the images into regions, and grouping the segregated audio streams to a region in the sequence of images, wherein identifying points of interest comprises identifying points of interest in each image region.

Further embodiments include determining for each region whether there are audio sources in the images corresponding to the region and not grouping the segregated audio streams to each region that does not have audio sources.

Further embodiments include removing audio sources corresponding to regions with no audio source from the plotted audio streams.

Further embodiments include determining a weight for each separated audio stream to indicate an importance of the audio stream.

Further embodiments include determining a region of the location of the selected point of interest, and fine-tuning weights for audio streams within the determined region before selecting a plotted audio stream.

Some embodiments pertain to a computer-readable medium having instructions thereon that when operated on by the computer cause the computer to perform operations that include identifying audio streams in audio of a video, the video having a sequence of images and associated audio, segregating the identified audio streams, identifying points of interest in each image, determining locations of the identified points of interest, plotting a position of each audio stream to a location of a point of interest in the sequence of images, receiving a selection of a point of interest in the sequence of images, selecting a plotted audio stream based on the corresponding point of interest, and enhancing the selected audio stream.

Further embodiments include analyzing the images of the video to divide the images into regions, and grouping the segregated audio streams to a region in the sequence of images, wherein identifying points of interest comprises identifying points of interest in each image region.

Further embodiments include determining for each region whether there are audio sources in the images corresponding to the region and not grouping the segregated audio streams to each region that does not have audio sources.

Further embodiments include removing audio sources corresponding to regions with no audio source from the plotted audio streams.

Some embodiments pertain to an apparatus that includes a video store to provide video, the video having a sequence of images and associated audio, an audio stream separator to identify audio streams in the audio of the video and to segregate the identified audio streams, an object detector to identify points of interest in each image and to determine locations of the identified points of interest, a stream plotter coupled to the audio stream separator and to the object detector to plot a position of each audio stream to a location of a point of interest in the sequence of images, a user interface to receive a selection of a point of interest in the sequence of images, a stream selector coupled to the stream plotter to select a plotted audio stream based on the corresponding point of interest, and a stream enhancer to enhance the selected audio stream.

In further embodiments the user interface further comprises a point of interest selector to receive a selection of a displayed object of the images from a user and to convert the selected object to a point of interest.

In further embodiments the stream plotter tags each audio stream with location and object of interest information, the apparatus further comprising a memory to store the tagged audio streams.

Further embodiments include a stream grouper to group audio streams based on location and wherein the stream plotter compares phase of an audio stream at two different microphones by cross-correlating audio streams of a group in the frequency domain to determine a direction of the audio stream and plots the position using the determined direction.

In further embodiments the audio stream separator further determines a weight for each separated audio stream to indicate an importance of the audio stream.

What is claimed is:

1. A method comprising:
   identifying audio streams in audio of a video, the video having a sequence of images and associated audio;
   segregating the identified audio streams;
   identifying points of interest in each image;
   determining locations of the identified points of interest;
   grouping the segregated audio streams to a region in the sequence of images;
   plotting a position of each audio stream to a location of a point of interest in the sequence of images;
   receiving a selection of a point of interest in the sequence of images;
   selecting a plotted audio stream based on a tagged location and the corresponding point of interest; and
   enhancing the selected audio stream.

2. The method of claim 1, wherein plotting a position comprises comparing phase of an audio stream at two different microphones to determine a direction of the audio stream and plotting the position using the determined direction.

3. The method of claim 2, wherein plotting comprises cross-correlating audio streams in the frequency domain.

4. The method of claim 2, wherein plotting comprises determining a direction of arrival for each audio stream using a discrete Fourier transform and narrowband estimation.

5. The method of claim 4, further comprising thresholding frequency coefficients of the discrete Fourier transform to select only frequencies with power above the threshold for use in determining the direction of arrival.

6. The method of claim 1, wherein plotting further comprises plotting distance based on the volume of the respective audio stream.

7. The method of claim 1, further comprising:
   analyzing the images of the video to divide the images into regions;
   wherein identifying points of interest comprises identifying points of interest in each image region.

8. The method of claim 7, further comprising determining for each region whether there are audio sources in the images corresponding to the region and not grouping the segregated audio streams to each region that does not have audio sources.

9. The method of claim 8, further comprising removing audio sources corresponding to regions with no audio source from the plotted audio streams.

10. The method of claim 7, further comprising determining a weight for each separated audio stream to indicate an importance of the audio stream.

11. The method of claim 10, further comprising:
    determining a region of the location of the selected point of interest; and
    fine-tuning weights for audio streams within the determined region before selecting a plotted audio stream.

12. A non-transitory computer-readable medium having instructions thereon that when operated on by the computer cause the computer to perform operations comprising:
    identifying audio streams in audio of a video, the video having a sequence of images and associated audio;
    segregating the identified audio streams;
    identifying points of interest in each image;
    determining locations of the identified points of interest;
    grouping the segregated audio streams to a region in the sequence of images;
    plotting a position of each audio stream to a location of a point of interest in the sequence of images;
    receiving a selection of a point of interest in the sequence of images;
    selecting a plotted audio stream based on a tagged location and the corresponding point of interest; and
    enhancing the selected audio stream.

13. The medium of claim 12, the operations further comprising:
    analyzing the images of the video to divide the images into regions;
    wherein identifying points of interest comprises identifying points of interest in each image region.

14. The medium of claim 12, the operations further comprising determining for each region whether there are audio sources in the images corresponding to the region and not grouping the segregated audio streams to each region that does not have audio sources.

15. The medium of claim 14, the operations further comprising removing audio sources corresponding to regions with no audio source from the plotted audio streams.

16. An apparatus comprising:
    a video store to provide video, the video having a sequence of images and associated audio;
    an audio stream separator to identify audio streams in the audio of the video and to segregate the identified audio streams;
    an object detector to identify points of interest in each image and to determine locations of the identified points of interest;
    a stream grouper to group segregated audio streams to a region in the sequence of images;
    a stream plotter coupled to the audio stream separator and to the object detector to plot a position of each audio stream to a location of a point of interest in the sequence of images and to tag each audio stream with location and object of interest information;
a memory to store the tagged audio streams;
a user interface to receive a selection of a point of interest in the sequence of images;
a stream selector coupled to the stream plotter to select a plotted audio stream based on the tagged location and the corresponding point of interest; and
a stream enhancer to enhance the selected audio stream.

17. The apparatus of claim 16, wherein the user interface further comprises a point of interest selector to receive a selection of a displayed object of the images from a user and to convert the selected object to a point of interest.

18. The apparatus of claim 16, wherein the stream plotter tags each audio stream with location and object of interest information, the apparatus further comprising a memory to store the tagged audio streams.

19. The apparatus of claim 16, further comprising a stream grouper to group audio streams based on location and wherein the stream plotter compares phase of an audio stream at two different microphones by cross-correlating audio streams of a group in the frequency domain to determine a direction of the audio stream and plots the position using the determined direction.

20. The apparatus of claim 16, wherein the audio stream separator further determines a weight for each separated audio stream to indicate an importance of the audio stream.

\* \* \* \* \*